(12) United States Patent
Nakahira

(10) Patent No.: US 7,873,618 B2
(45) Date of Patent: Jan. 18, 2011

(54) MAP INFORMATION DISTRIBUTION SYSTEM, MAP INFORMATION DISTRIBUTION METHOD, AND COMPUTER-READABLE RECORDING MEDIUM

(75) Inventor: Toshikazu Nakahira, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 460 days.

(21) Appl. No.: 12/003,339

(22) Filed: Dec. 21, 2007

(65) Prior Publication Data

US 2008/0154890 A1 Jun. 26, 2008

(30) Foreign Application Priority Data

Dec. 25, 2006 (JP) ............................. 2006-347231
Nov. 26, 2007 (JP) ............................. 2007-304194

(51) Int. Cl.
*G06F 7/00* (2006.01)
*G06F 17/30* (2006.01)

(52) U.S. Cl. ..................... 707/705; 707/722; 701/200; 701/212

(58) Field of Classification Search ............... 707/705, 707/706, 722, 736, 758, 999.1; 701/200, 701/212
See application file for complete search history.

(56) References Cited

U.S. PATENT DOCUMENTS 5,774,362 A * 6/1998 Suzuki et al. ............... 701/208
7,739,038 B2 * 6/2010 Coch et al. .................. 701/208

2003/0060974 A1 * 3/2003 Miyahara et al. ............ 701/209
2004/0027258 A1 * 2/2004 Pechatnikov et al. ..... 340/995.1
2006/0247853 A1 * 11/2006 Jung et al. ................... 701/209

FOREIGN PATENT DOCUMENTS

JP A-2003-005632 1/2003
JP B2-3660287 3/2005

OTHER PUBLICATIONS

Ducasse et al. "Distribution Map", IEEE International Conference on Software Maintenance, 2006. ICSM, 2006, pp. 1-10. Download: http://ieeexplore.ieee.org/stamp/stamp.jsp?tp=&arnumber=4021339.*

* cited by examiner

*Primary Examiner*—John E Breene
*Assistant Examiner*—Hares Jami
(74) *Attorney, Agent, or Firm*—Oliff & Berridge, PLC

(57) ABSTRACT

A map information distribution system carries out a search based on search criteria that is input from a first terminal device, outputs predetermined map information for displaying search results to the first terminal device, causes the first terminal device to display a map based on the map information for displaying search results, and distributes predetermined map information for distribution in response to a distribution request. This map information distribution system includes a discrimination information outputting unit that outputs discrimination information to the first terminal device, and causes the first terminal device to display a discrimination indication based on the discrimination information before the map information for distribution is distributed. The discrimination information is designed to distinguish the area that can be displayed by a second terminal device that can use the map information for distribution, from the other portions in the map displayed by the first terminal device based on the map information for displaying search results.

9 Claims, 11 Drawing Sheets

POINT TO BE SET
TERMINAL DISPLAY CHECK MAP
FRAME INDICATION

○ :MODEL A  ○ :SCALE 1/△△△△△
● :MODEL A  ○ :SCALE 1/△△△△△
○ :MODEL A  ○ :SCALE 1/△△△△△
○ :MODEL A  ● :SCALE 1/△△△△△
○ :MODEL A  ○ :SCALE 1/△△△△△

POINT TO BE SET
TERMINAL DISPLAY CHECK MAP
FRAME INDICATION

○ :MODEL A ○ :SCALE 1/△△△△△
● :MODEL A ○ :SCALE 1/△△△△△
○ :MODEL A ○ :SCALE 1/△△△△△
○ :MODEL A ● :SCALE 1/△△△△△
○ :MODEL A ○ :SCALE 1/△△△△△

TERMINAL DISPLAY CHECK MAP

COLORS DISPLAYED BY    TERMINAL DISPLAY
CAR AUDIO DEVICE        CHECK MAP

MAP INFORMATION DISTRIBUTION SYSTEM, MAP INFORMATION DISTRIBUTION METHOD, AND COMPUTER-READABLE RECORDING MEDIUM

BACKGROUND OF THE INVENTION

1. Field of the Invention

The present invention generally relates to a map information distribution system, a map information distribution method, and a computer-readable recording medium, and more particularly, to a map information distribution system that distributes map information that can be used by a second terminal device different from a first terminal device for performing searches, a map information distribution method involving the map information distribution system, and a computer-readable recording medium to be used in the map information distribution system.

2. Description of the Related Art

There have been known techniques for distributing map information to terminal devices. As an example of a technique for displaying a map on a terminal device among such techniques, Japanese Unexamined Patent Publication No. 2003-5632 discloses a technique for distributing map information after determining the size of the subject map based on screen size information about the terminal device. Japanese Patent Publication No. 3,660,287 discloses a technique for distributing map information after determining the distribution unit based on attribute information including the screen size information about the terminal device. By each of those techniques, the terminal device that receives distributed map information uses the distributed map information.

Meanwhile, there is a second terminal device that can display a map without map information for navigations (such as a car audio device), though it does not directly receive distributed map information. Such a second terminal device can display the minimum necessary map by reading map information from a recording medium such as a USB (Universal Serial Bus) memory or a CD-R (Compact Disk Recordable). In such a case, the map information can be obtained from a predetermined Web site. Users download the map information in advance from the Web site to a personal computer (the first terminal device), and stores the map information on a recording medium. In this manner, the map information for the second terminal device can be prepared. As the Internet is widely used in these days, inexpensive terminal devices that can display the minimum necessary maps can be provided for users who do not require full-scale, expensive navigation systems.

In a case where map information is obtained through a personal computer or the like as described above, a user first uses a Web browser to access the predetermined Web site provided by a map distribution system. When the user inputs certain search criteria through the Web site, the search criteria is input to the map information distribution system. Receiving the search criteria, the map information distribution system carries out a search, and outputs map information for displaying search results to the personal computer. As a result, a search result check map is displayed on the personal computer through the Web browser. When the user further inputs a distribution request, the map information distribution system distributes map information for distribution to the personal computer in response to the distribution request. The map information for displaying search results is designed so that the map can be displayed within a predetermined area, and predetermined contents of information (such as icons representing facilities and the names of the facilities) can be displayed in predetermined display colors. Also, the scale is set in advance, and users can change the scale. The map information for distribution is designed so that the map can be displayed on the scale set for the map information for displaying search results, the map can be displayed within the predetermined area set for the model of the second terminal device, and predetermined contents of information can be displayed in predetermined display colors.

It is normally preferable that the search result check map is displayed in a larger area, as the check on the map becomes easier. On the other hand, the map information for distribution is distributed as the information about a smaller map than the search result check map, since the display area of the map information for distribution is limited to the size of the second terminal device that uses the map information for distribution. Therefore, if the search result check map is slightly shifted from the position in which it is actually expected to be displayed, the map might not be displayed in the desired area on the second terminal device that uses the map information for distribution.

Since the display area of the second terminal device is smaller than that of the personal computer, there is a possibility of a decrease in visibility if the contents of the map to be displayed on the second terminal device are the same as the contents of the check map. In a case where the display colors used in the second terminal device are limited by its specification, the colors in the map displayed on the second terminal device differ from the colors in the check map displayed on the personal computer. This results in a decrease in visibility. Therefore, the contents of information and the display colors should preferably be set as the default settings, with the visibility at the second terminal device being taken into consideration. However, the default settings are not necessarily useful to all users. Therefore, it is preferable that those settings can be changed by users.

SUMMARY OF THE INVENTION

It is therefore an object of the present invention to provide a map information distribution system, a map information distribution method, and a computer-readable recording medium in which the above disadvantages are eliminated.

A more specific object of the present invention is to provide a map information distribution system, a map information distribution method, and a computer-readable recording medium that can increase the usability of maps to be displayed by the second terminal device that is different from the first terminal device that carries out searches.

According to an aspect of the present invention, there is provided a map information distribution system that carries out a search based on search criteria that is input from a first terminal device, outputs predetermined map information for displaying search results to the first terminal device, causes the first terminal device to display a map based on the map information for displaying search results, and distributes predetermined map information for distribution in response to a distribution request, the map information distribution system including: a discrimination information outputting unit that outputs discrimination information to the first terminal device, and causes the first terminal device to display a discrimination indication based on the discrimination information before the map information for distribution is distributed, the discrimination information being designed to distinguish an area that can be displayed by a second terminal device that can use the map information for distribution, from other portions in the map displayed by the first terminal device based on the map information for displaying search results. According to the above aspect, the first terminal device can display a discrimination indication superimposed on the search result check map, or adds a discrimination indication. With this arrangement, a user can check the area the second terminal device can display in advance. Accordingly, the user can easily adjust the point designated as the center point of the map. In this manner, the possibility that the map is not displayed in the desired area on the second terminal device can be eliminated by this invention. Thus, in accordance with this invention, the usability of the map to be displayed on the second terminal device can be increased.

According to another aspect of the present invention, there is provided a method for distributing map information by which a search is carried out based on search criteria that is input from a first terminal device, predetermined map information for displaying search results is output to the first terminal device, the first terminal device is caused to display a map based on the map information for displaying search results, and predetermined map information for distribution is distributed in response to a distribution request, the method including the steps of: outputting discrimination information to the first terminal device, and causing the first terminal device to display a discrimination indication based on the discrimination information before the map information for distribution is distributed, the discrimination information being designed to distinguish an area that can be displayed by a second terminal device that can use the map information for distribution, from other portions in the map displayed by the first terminal device based on the map information for displaying search results.

According to a further aspect of the present invention, there is provided a computer-readable recording medium that has a program recorded thereon, the program being executed to cause a computer to: receive an input of search criteria to search for map information for distribution to be displayed by a second terminal device; connect to a server device that stores the map information for distribution via a communication network; obtain map information for displaying search results from the server device in accordance with the search criteria; display discrimination information that is designed to distinguish an area that can be displayed by the second terminal device from other portions in a map to be displayed based on the map information for displaying search results; and display a discrimination indication based on the discrimination information.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of preferred embodiments of the present invention, with reference to the accompanying drawings.

First Embodiment

Figure 1:
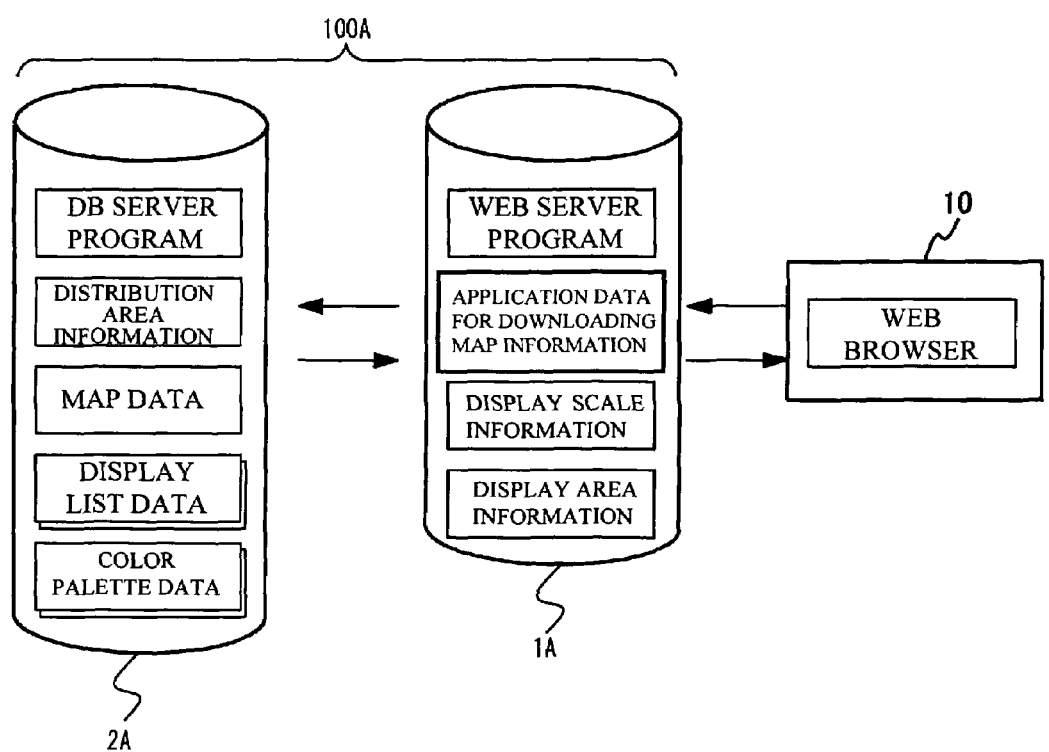
FIG. 1 schematically shows a map information distribution system and a personal computer in accordance with the present invention.

FIG. 1 is a schematic view of a map information distribution system 100A in accordance with this embodiment, along with a personal computer (hereinafter referred to as PC (the first terminal device)) 10 to be used by users. A Web browser is installed in the PC 10. The PC 10 can access various Web sites via the Internet, using the Web browser. The map information distribution system 100A includes a Web server 1A and a map database (hereinafter referred to simply as DB) server 2A. To disperse the functions and load, it is preferable that the map information distribution system 100A is formed with servers such as the Web server 1A and the map DB server 2A of this embodiment, but may be formed with a single server.

The Web server 1A is a structure to provide Web sites particularly related to map information distribution services. A program designed for Web servers is installed in the Web server 1A. Based on the Web server program, the Web server 1A performs not only the operation to provide Web sites but also various other operations such as the input and output operations related to map information distribution services. Also, an application program for downloading map information is installed in the Web server 1A. Based on this program, the Web server 1A performs the operation to distribute map information for distribution to the PC 10. Scale information related to map information for displaying search results (hereinafter referred to simply as the display scale information) and area information related to the map information for displaying search results (hereinafter referred to simply as the display area information) are stored in the PC 10. The display scale information and the display area information may be stored in the map DB server 2A, instead of the PC 10.

The map DB server 2A is a structure to generate mostly map information. A program designed for DS servers is installed in the map DB server 2A. Based on the DB server program, the map DB server 2A performs not only the operation to generate the map information for displaying search results and the map information for distribution, but also various other operations such as the operation to generate discrimination information and the input and output operations related to map information distribution services. The discrimination information is designed for distinguishing the area that can be displayed by a car audio device (the second terminal device) from other areas in a search result confirmation map to be displayed on the PC 10 in accordance with the map information for displaying search results. The area information related to the map information for distribution (hereinafter referred to simply as the distribution area information) is stored for each model of car audio devices that can use the map information for distribution) in the map DB server 2A.

The map DB server 2A also stores display list data indicating the contents of information to be displayed, and color palette data indicating the display colors in which information is to be displayed. The display list data and the color palette data are prepared for both the map information for displaying search results and the map information for distribution. Based on input search criteria, the display scale information, the display area information, and the likes, the map DB server 2A generates the map information for displaying search results. The map DE server 2A also generates the map information for distribution, based on the above described data, point information indicating the point set as the center point of the subject map (hereinafter referred to simply as the point information), the distribution area information about the model of the selected car audio device.

Next, the operations to be performed by the map information distribution system 100A are described. When a user uses the Web browser to access a Web site provided by the Web server 1A, the information about the display pages constituting the Web site is output from the Web server 1A to the PC 10, and a page of the Web site is displayed on the PC 10 by the Web browser. FIGS. 2A through 2F schematically show display pages of a Web site. A Web site is formed with the different display pages shown in FIGS. 2A through 2F. In this embodiment, a Web site includes the display pages shown in FIGS. 2A through 2C, but does not include the display pages shown in FIGS. 2D through 2F, since those shown in FIGS. 2D through 2F are not necessary in this embodiment. When a user selects and clicks "CANCEL" on one of those display pages, the screen switches to the previous display page.

Figure 2A:
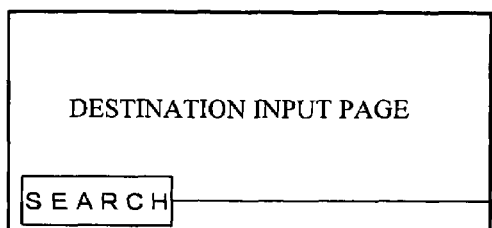
FIGS. 2A through 2F are schematic views of display pages of a Web site.

The destination input page shown in FIG. 2A is designed to receive inputs of destinations as search criteria. When a user inputs search criteria and clicks "SEARCH", the input search criteria are output from the PC 10 to the Web server 1A. The Web server 1A then outputs the input search criteria, together with the display scale information and display area information, to the map DB server 2A. Based on the input search criteria, the map DB server 2A carries out a search, and generates and outputs the map information for displaying search results to the Web server 1A.

Figure 2B:
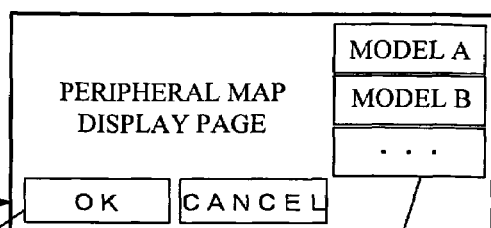
Figure 2D:
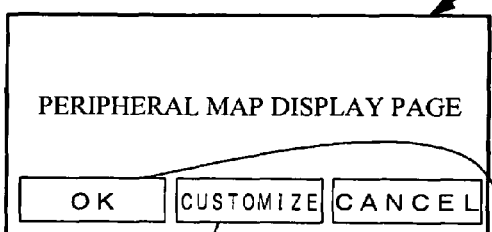

The peripheral map display page shown in FIG. 2B is designed to display a search result check map based on the map information for displaying search results. Therefore, the Web server 1A that has received the map information for displaying search results also outputs the map information for displaying search results, together with the information about the peripheral map display map shown in FIG. 2B, to the PC 10. As a result, the PC 10 displays the peripheral map display page shown in FIG. 2B through the Web browser, and also displays the search result check map on the peripheral map display page. The peripheral map display page is also designed to select a model of a car audio device that can use the map information for distribution. In this embodiment, when a user selects a car audio device on this page, the model information about the selected car audio device is output from the PC 10 to the Web server 1A. The Web server 1A then outputs the input model information, together with the display scale information, to the map DB server 2A.

Figure 2C:
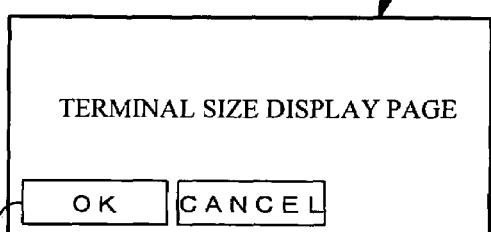
Figure 2E:
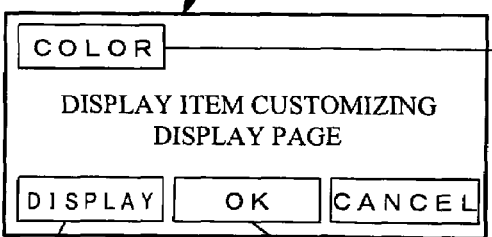
Figure 2F:
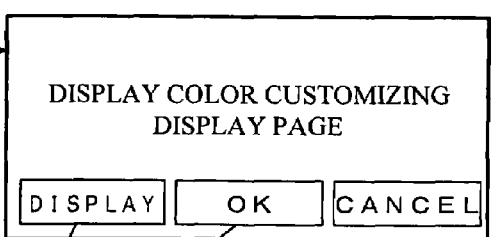

Based on the display scale information and the input model information, the map DB server 2A generates and outputs the discrimination information to the Web server 1A. In this embodiment, the discrimination information is generated as the indication information about the frame surrounding the area that can be displayed by a car audio device of the selected model in the search result check map. The peripheral map display page shown in FIG. 2C is designed to display a distinguished display based on the discrimination information superimposed on the search result check map. Therefore, the Web server 1A outputs the input discrimination information, together with the information about the peripheral map display page shown in FIG. 2C, to the PC 10. As a result, the PC 10 displays the peripheral map display page shown in FIG. 2C through the Web browser, and also displays the terminal display check map shown in FIG. 3 on this display page.

Figure 3:
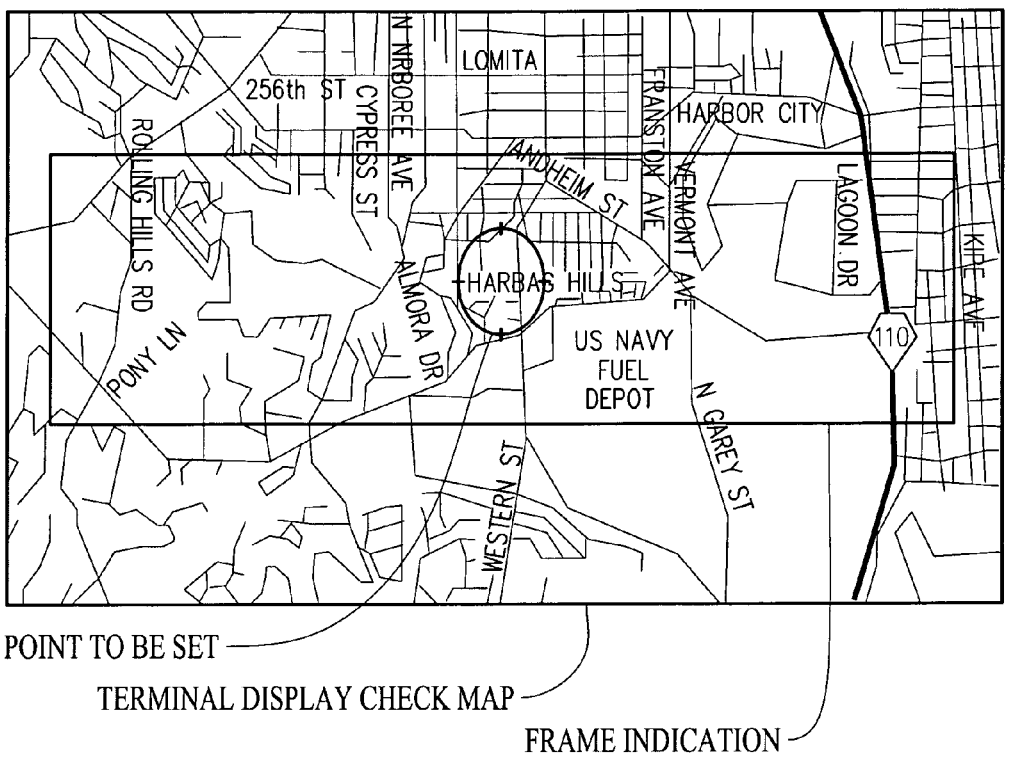
FIG. 3 schematically shows a terminal display check map in accordance with a first embodiment of the present invention.

As shown in FIG. 3, the peripheral map display page shown in FIG. 2C is designed to change the scale setting with respect to the map information for displaying search results. When a user changes the scale setting, the map information for displaying search results on a different scale is output to the PC 10. A terminal display check map is then displayed on the new scale. Alternatively, the peripheral map display page shown in FIG. 2B may be designed to change the scale setting. Like the peripheral map display page shown in FIG. 2B, the peripheral map display page shown in FIG. 2C is also designed to select a model of a car audio device that can use the map information for distribution, as shown in FIG. 3. The peripheral map display pages shown in FIGS. 2B and 2C are also designed to perform the operation of adjusting the point representing the center point of the map. With this arrangement, a user can refer to the displayed terminal display check map, and easily adjust the point representing the center point of the map in advance.

When a user determines that there is not a problem and clicks "OK" as a result of a check on the terminal display check map shown in FIG. 3, a request for distribution of the map information for distribution, together with the point information, is output from the PC 10 to the Web server 1A. The Web server 1A then outputs the distribution request and the point information to the map DB server 2A. Upon receipt of the distribution request, the map DB server 2A generates and outputs the map information for distribution as a download file in a predetermined format to the Web server 1A. The Web server 1A then distributes the map information for distribution to the PC 10. As the distribution request can be made on the peripheral map display page shown in FIG. 2C, a user can check the area that can be displayed by the car audio device, before downloading the map information for distribution. In other words, as each Web site is designed to receive the model information before the receipt of the distribution request and to output the discrimination information at the time of the input of the model information, the map information distribution system 100A can output the discrimination information before the distribution of the map information for distribution.

Since the discrimination information depends on the map information for displaying search results in this embodiment, the basic discrimination information corresponding to input model information is detected from basic discrimination information stored in advance for each model of car audio devices, and the discrimination information is generated from the basic discrimination information by determining the size of the display frame for the basic discrimination information based on the display scale information. However, the present invention is not limited to that structure. For example, in a case where the discrimination information is to depend on the display area of the PC 10, the discrimination information may be prepared and stored in advance for each model of car audio devices, and the discrimination information corresponding to input model information may be output.

In this embodiment, the discrimination information generating unit is realized by the map DB server 2A and the program portion designed to generate the discrimination information among the DB server programs designed to perform the above described operation. In this embodiment, the discrimination information outputting unit is realized by the Web server 1A and the program designed to output the discrimination information to the PC 10 and to cause the PC 10 to display the discrimination indication among the Web server programs designed to perform the above described operations. With the above described structures, this embodiment can provide the map information distribution system 100A that can increase the usability of maps to be displayed on a car audio device that is different from the PC 10 that carries out searches.

Second Embodiment

A map information distribution system 100B in accordance with this embodiment is the same as the map information distribution system 100A of the first embodiment, except that the map DB server 2A is replaced with a map DB server 2B. The map DB server 2B is also the same as the map DB server 2A, except that the DB server program is designed to further generate different discrimination information from the above. This discrimination information is generated as indication information for blurring the portions outside the area that can be displayed by a car audio device, as well as the frame. Therefore, in this embodiment, the discrimination information generating unit is realized by the map DB server 2B and the program designed to generate this discrimination information among the DB server programs. Meanwhile, the discrimination information outputting unit is realized in the same manner as in the first embodiment.

Figure 4:
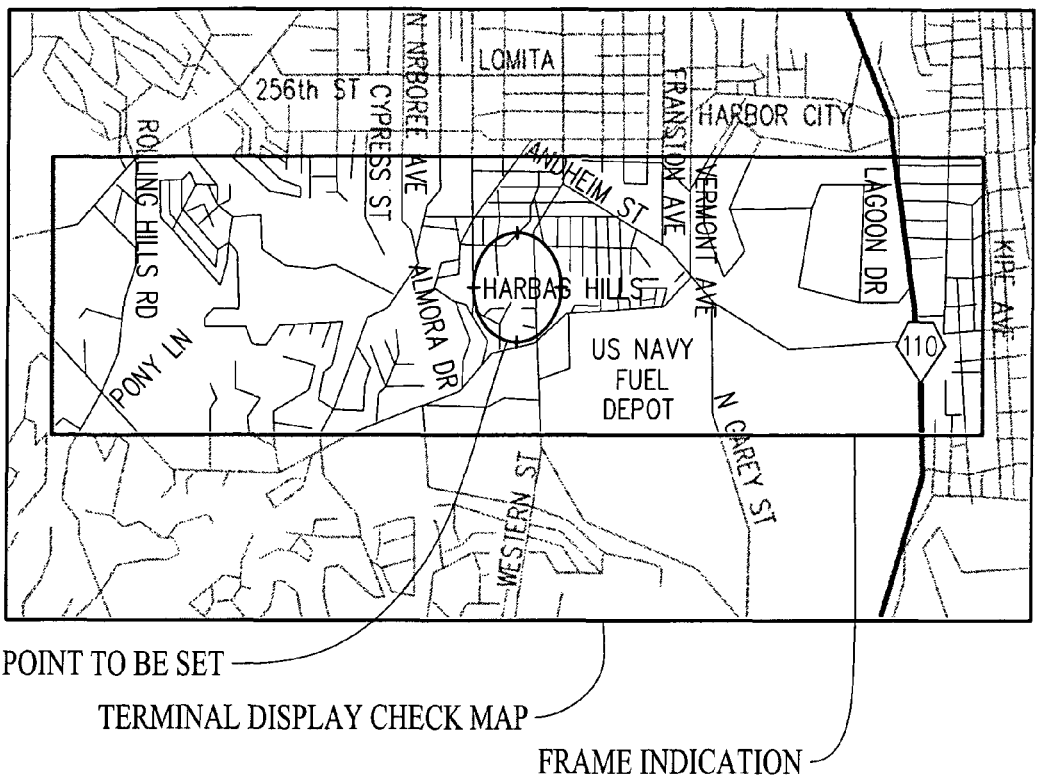
FIG. 4 schematically shows a terminal display check map in accordance with a second embodiment of the present invention.

When a user selects a car audio device on the above described peripheral map display page shown in FIG. 2B, the peripheral map display page of FIG. 2C that is designed to display the discrimination indication based on the discrimination information superimposed on the search result check map is displayed on the PC 10, as in the first embodiment. In this embodiment, the terminal display check map shown in FIG. 4 is displayed on this display page. On this terminal display check page, the portions outside the area that can be displayed by the car audio device on the search result display page are further blurred with the discrimination indication. Accordingly, the user can recognize the area that can be displayed by the car audio device, before downloading the map information for distribution, as in the first embodiment. With the above described structures, this embodiment can provide the map information distribution system 100B that can increase the usability of maps to be displayed by a car audio device that is different from the PC 10 that carries out searches.

Third Embodiment

A map information distribution system 100C in accordance with this embodiment is the same as the map information distribution system 100A of the first embodiment, except that the Web server 1A is replaced with a Web server 1C, and the map DB server 2A is replaced with a map DB server 2C. The Web server 1C is the same as the Web server 1A, except for the following aspects. The Web server program is designed to output the point information from the PC 10 to the Web server 1C, when a user clicks "OK" after the peripheral map display page of FIG. 2C is superimposed on the peripheral map display page of FIG. 2B. The Web server 1C is designed to provide Web sites having the terminal size display page shown in FIG. 2D. The Web server 1C is also designed to perform input and output operations accompanying the above described operation.

Meanwhile, the map DB server 2C is the same as the map DB server 2A, except that the DB server program is designed to further generate different discrimination information from the above. This discrimination information is generated as indication information for displaying only the area that can be displayed by a car audio device of a selected model in the search result check map (or indication information for displaying the terminal size). Therefore, in this embodiment, the discrimination information generating unit is realized by the map DB server 2C and the program designed to generate this discrimination information among the Web server programs. Meanwhile, the discrimination information outputting unit is realized by the Web server 1C and the program designed to output this discrimination information to the PC 10 and to cause the PC 10 to display the discrimination indication based on this discrimination information, among the Web server programs.

When a user clicks "OK" on the peripheral map display page shown in FIG. 2B, the point information is output from the PC 10 to the Web server 1C. This output is made as a request for the discrimination information (the information for displaying the terminal size). The Web server 1C then outputs the point information, together with the model information and the display scale information, to the map DB server 2C. Receiving those pieces of information, the map DB server 2C generates discrimination information. In this embodiment, this discrimination information is generated as a kind of map information. More specifically, the discrimination information is generated based on distribution area information that is set in accordance with the point information, the display scale information and the model of the selected car audio device, as well as the map data, the display list data set for the map information for displaying search results, and the color palette data.

The map DB server 2C then outputs the discrimination information to the Web server 1C. The terminal size display page shown in FIG. 2D is designed to display the discrimination indication based on the discrimination information. Therefore, the Web server 1C that has received the discrimination information outputs the discrimination information, together with the information about the peripheral map display page of FIG. 2D, to the PC 10. As a result, the terminal display check map shown in FIG. 5, as well as the terminal size display page of FIG. 2D, is displayed on the PC 10. In the terminal display check map, only the area that can be displayed by the selected car audio device in the search result check map is displayed.

With this arrangement, the user can recognize the area that can be displayed by the car audio device, before downloading the map information for distribution, as in the first embodiment. In a modification of this embodiment, the discrimination information may be generated or stored in advance as indication information that is designed to mask the portions outside the area that can be displayed by a selected car audio device in the search result check map with the background color of the peripheral map display page show in FIG. 2C. The discrimination indication based on this discrimination information is then superimposed on the search result display map on the peripheral map display page shown in FIG. 2C, so that only the area that can be displayed by the selected car audio device is displayed, as in the first and second embodiments. With the above described structures, this embodiment can provide the map information distribution system 100C that can increase the usability of maps to be displayed by a car audio device that is different from the PC 10 that carries out searches.

Fourth Embodiment

A map information distribution system 100D in accordance with this embodiment is the same as the map information distribution system 100C of the third embodiment, except that the map DB server 2C is replaced with a map DB server 2D. The map DB server 2D is also the same as the map DB server 2C, except that the DB server program is designed to further generate different discrimination information from the above. In this embodiment, the discrimination information is generated as indication information for displaying only the area that can be displayed by the selected car audio device in the same display format as the map displayed by the car audio device. Therefore, in this embodiment, the discrimination information generating unit is realized by the map DB server 2D and the program designed to generate this discrimination information among the ED server programs. Meanwhile, the discrimination information outputting unit is realized in the same manner as in the third embodiment.

When a user clicks "OK" on the peripheral map display page shown in FIG. 2B, a request for the discrimination information (the information for displaying the terminal size) is output from the PC 10, and the car audio device model information, the point information, and the display scale information are input to the map DB server 2D, as in the third embodiment. Receiving those pieces of information, the map DB server 2D generates discrimination information. In this embodiment, this discrimination information is generated as a kind of map information. More specifically, the discrimination information is generated based on distribution area information that is set in accordance with the point information, the display scale information and the model of the selected car audio device, as well as the map data, the display list data set for the map information for displaying search results, and the color palette data.

Figure 6:
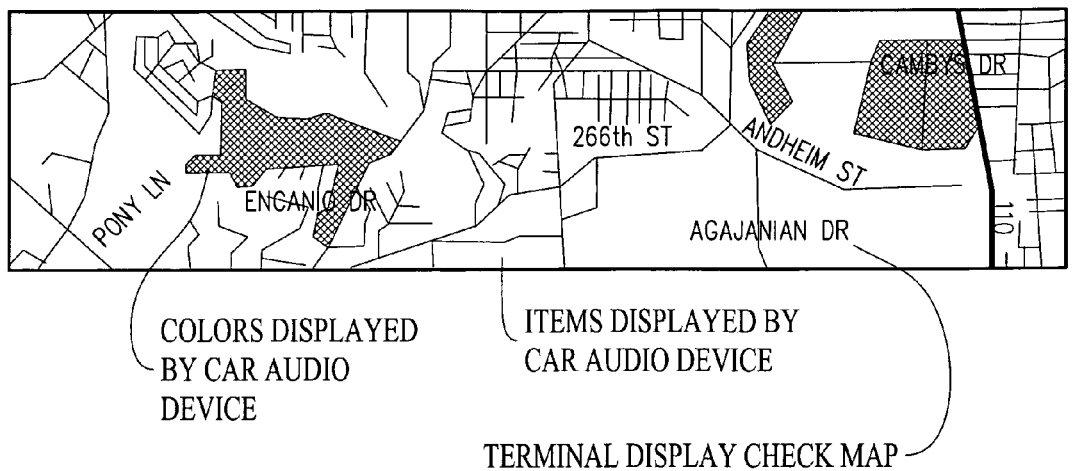
FIG. 6 schematically shows a terminal display check map in accordance with a fourth embodiment of the present invention.

The map DB server 2D then outputs the discrimination information to the Web server 1C. The Web server 1C that has received the discrimination information outputs the discrimination information, together with the information about the peripheral map display page of FIG. 2D, to the PC 10. As a result, the terminal display check map shown in FIG. 6, as well as the terminal size display page of FIG. 2D, is displayed on the PC 10. In the terminal display check map, only the area that can be displayed by the selected car audio device in the search result check map is displayed in the same display format as the map displayed by the car audio device.

With this arrangement, the user can recognize the area that can be displayed by the car audio device, before downloading the map information for distribution, as in the first embodiment. Since the discrimination information is generated based on the display list data and the color palette data that is set for the map information for distribution in this embodiment, the map equivalent to the map to be displayed by the selected car audio device can be checked in advance. As each map can be visually checked in advance in this embodiment, the usability of maps to be displayed by the car audio device can be further increased. With the above described structures, this embodiment can provide the map information distribution system 100D that can increase the usability of maps to be displayed by a car audio device that is different from the PC 10 that carries out searches.

Fifth Embodiment

A map information distribution system 100E in accordance with this embodiment is the same as the map information distribution system 100D of the fourth embodiment, except that the Web server 1C is replaced with a Web server 1E. The Web server 1E is also the same as the Web server 1C of the fourth embodiment, except that the Web server program is designed to provide Web sites having the display pages shown in FIGS. 2E and 2F, and to perform additional input and output operations accompanying the operations of providing such Web sites. When a user clicks "CUSTOMIZE" on the display page shown in FIG. 2D, a request for a display page for customizing display items is output from the PC 10 to the Web server 1E. Upon receipt of this request, the Web server 1E outputs the information about the display item customizing page shown in FIG. 2E to the PC 10. As a result, the display item customizing page shown in FIG. 2E is displayed on the PC 10.

Figure 7:
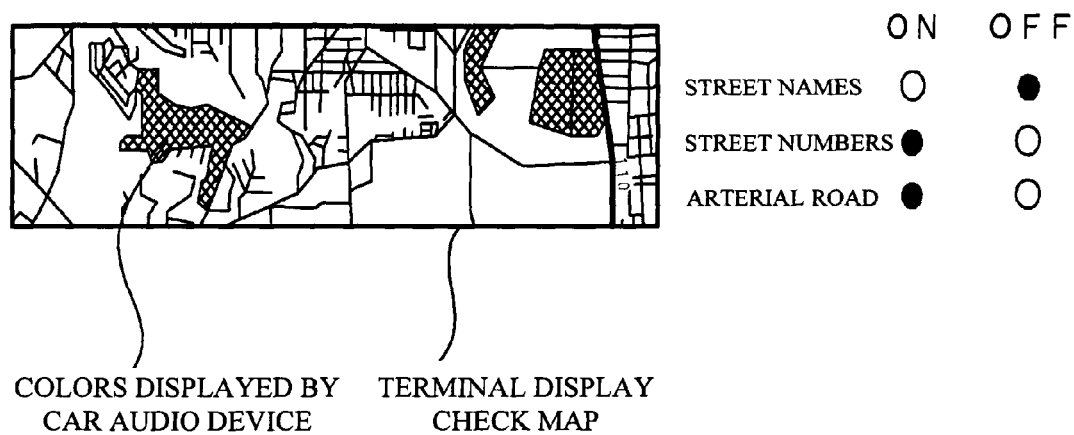
FIG. 7 schematically shows a terminal display check map when the setting items are customized in accordance with the fifth embodiment.

This display page is designed to allow users to change the contents of the display list data that is set with respect to the map information for distribution. More specifically, this display page is designed to display the contents of various kinds of information (such as the names of streets) as the setting items, as well as the terminal display check map, as shown in FIG. 7. For example, when a user clicks "OFF" with respect to the names of streets and then clicks "DISPLAY", the setting information set for the setting items is output from the PC 10 to the Web server 1E. Receiving the setting information, the Web server 1E outputs the setting information to the map DB server 2D. Here, the setting information is output as a request to update the setting values. Receiving the setting information, the map DB server 2D updates the set contents of the display list data about the map information for distribution, and generates the discrimination information based on the updated display list data and the likes, as in the fourth embodiment. After generating the discrimination information, the map DB server 2D outputs the discrimination information to the PC 10 via the Web server 1E. As a result, the terminal display check map not showing the names of streets as shown in FIG. 7 is newly displayed on the PC 10.

Figure 8:
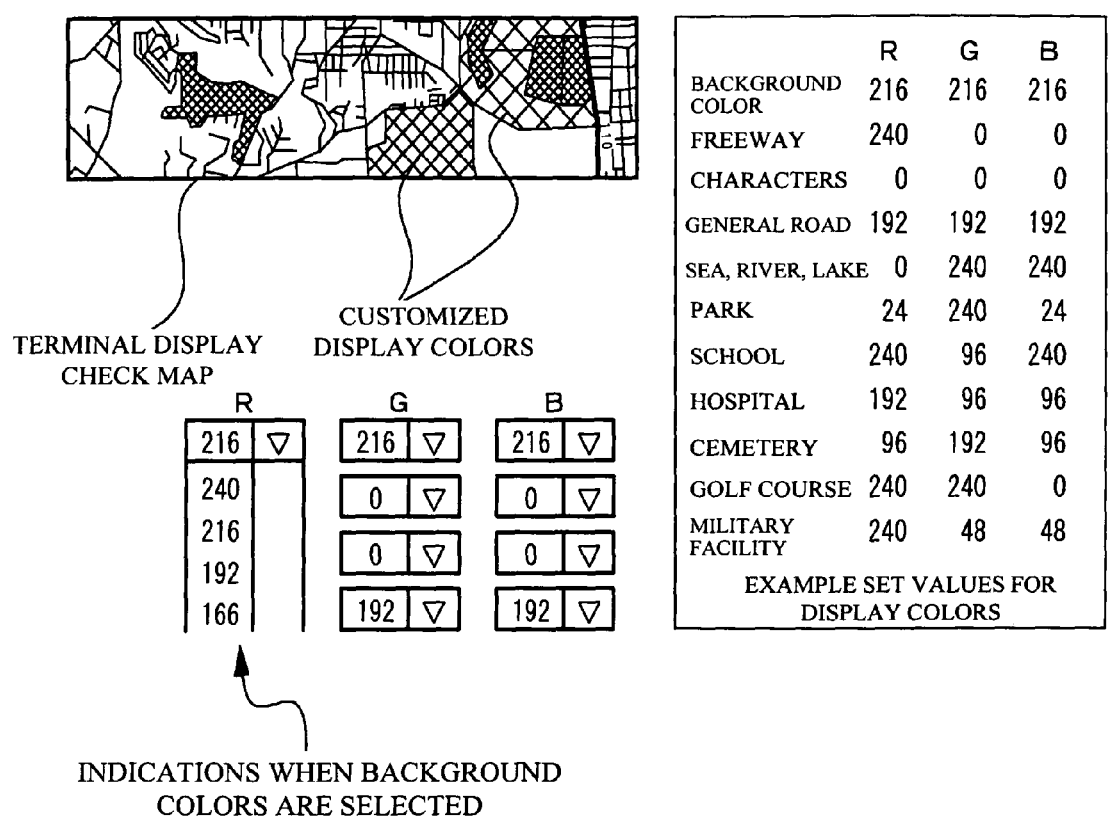
FIG. 8 schematically shows a terminal display check map when the display colors are customized in accordance with the fifth embodiment.

Meanwhile, when a user clicks "COLOR" on the display item customizing page shown in FIG. 2E, a request for a display color customizing page is output from the PC 10 to the Web server 1E. Receiving this request, the Web server 1E outputs the information about the display color customizing page shown in FIG. 2F to the PC 10. As a result, the display color customizing page shown in FIG. 2F is displayed on the PC 10. This display page is designed to allow users to change the contents of the color palette data that is set with respect to the map information for distribution. More specifically, this display page is designed to display the display colors of various setting items, as well as the terminal display check map, as shown in FIG. 8. For example, the display colors can be changed by adjusting the degrees of R (red), G (green), and B (blue), as shown in FIG. 8.

For example, when a user selects a change in the setting of R (red) in the background colors, a list for allowing the user to select setting values appears, as shown in FIG. 8. The range of the setting values that can be set in this list is limited to the range of colors that can be displayed by the selected car audio device. As the user clicks "DISPLAY" after changing the setting of a display color, the information about the settings for the display colors of the setting items is output from the PC 10 to the Web server 1E. Receiving the setting information, the Web server 1E outputs the setting information to the map DB server 2D. Here, the setting information is output as a request to update the setting values. Receiving the setting information, the map DB server 2D updates the contents set in the color palette data about the map information for distribution, and generates the discrimination information based on the updated color palette data and the likes, as in the fourth embodiment. After generating the discrimination information, the map DB server 2D outputs the discrimination information to the PC 10 via the Web server 1E. As a result, the terminal display check map having the display colors changed as shown in FIG. 8 is newly displayed on the PC 10.

In this embodiment, the contents and display colors of information to be displayed by a selected car audio device can be set by users, as described above. After each customizing operation, the map to be displayed by the car audio device can be checked in advance. Accordingly, the usability of maps to be displayed by the car audio device can be further increased. With the above described structures, this embodiment can provide the map information distribution system 100E that can increase the usability of maps to be displayed by a car audio device that is different from the PC 10 that carries out searches.

Sixth Embodiment

Figure 9A:
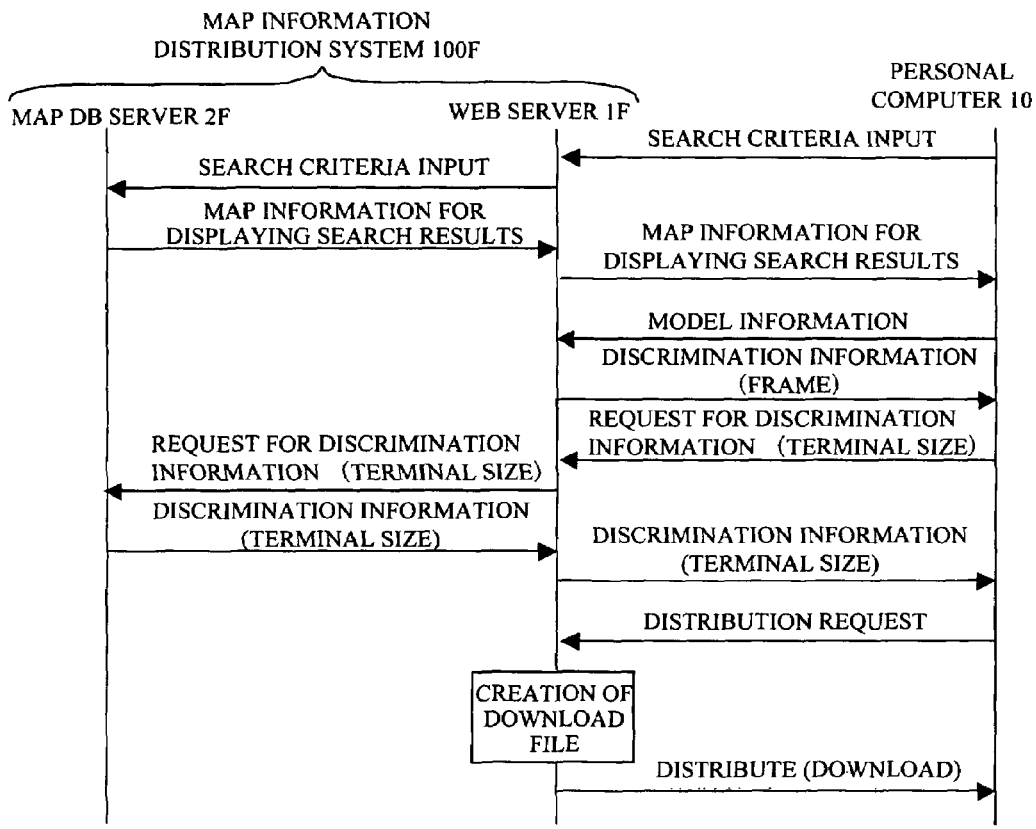
FIGS. 9A through 9C are flowcharts showing a method for distributing map information in accordance with the present invention.
Figure 9B:
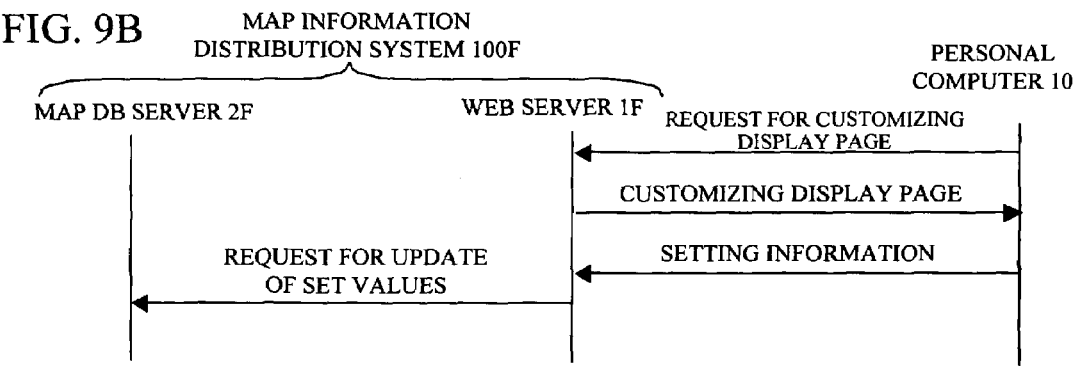
Figure 9C:
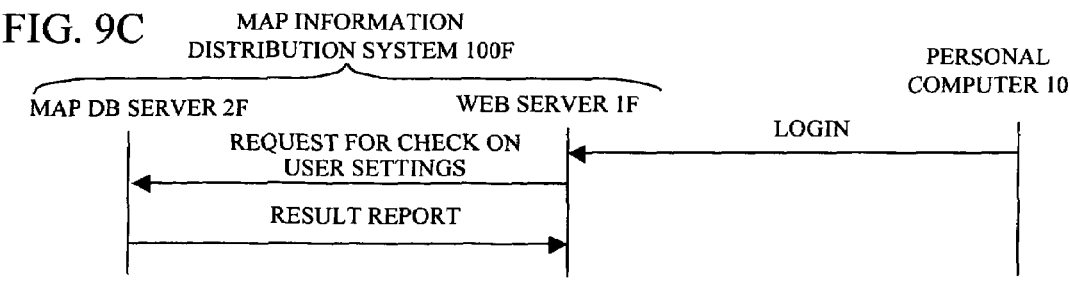

Referring now to the flowcharts shown in FIGS. 9A through 9C, a method for distributing map information in accordance with this embodiment is described in detail. The map information distribution system 100F shown in FIGS. 9A through 9C differs from any of the map information distribution systems 100A through 100E of the foregoing embodiments in having a Web server 1F and a map DB server 2F. However, the Web server 1F and the map DB server 2F are formed by combining some of the suitable functions realized in the map information distribution systems 100A through 10E. FIG. 9A is a flowchart showing the fundamentals of the method for distributing map information. When a user inputs a destination as the search criteria, the search criteria is input from the PC 10 to the Web server 1F. Receiving the search criteria, the Web server 1F outputs the search criteria to the map DB server 2F. Since the map DB server 2F stores the display scale information and the display area information in this embodiment, those pieces of information are not output from the Web server 1F to the map DB server 2F. However, the display scale information and the display area information may be output at the same time, if necessary.

Receiving the search criteria, the map DB server 2F generates the map information for displaying search results, and outputs the map information for displaying search results to the Web server 1F. Here, the display scale information and the likes may also be output at the same time, if necessary. The Web server 1F then outputs the map information for displaying search results to the PC 10. Here, the information about a display page like the display page shown in FIG. 2B (or a display page that can display the search result display map, or a display page that can receive an input of the model information) may also be output at the same time, if necessary. The search result check map is then displayed by the Web browser on the PC 10 that has received the map information for displaying search results. When the user performs an input of the model information through a predetermined procedure, the model information is input from the PC 10 to the Web server 1F.

In this embodiment, the Web server program of the Web server 1F is designed to generate the discrimination information (for displaying the frame) described in the first embodiment. Accordingly, the Web server 1F that has received the model information generates the discrimination information, and outputs the discrimination information to the PC 10. Here, based on the map information for displaying search results, the Web server 1F may generate new map information so that the search result check map includes a frame indication, and output the map information as the discrimination information to the PC 10. Also, the information about a display page like the display page shown in FIG. 2C (or a display page that can display the discrimination information) may be output at the same time, if necessary. The PC 10 that has received the discrimination information then displays the terminal check map through the Web browser.

When a user performs a predetermined operation to input a request for the discrimination information (the information for displaying the terminal size) described in the fourth embodiment, this request is output from the PC 10 to the Web server 1F, and is further output from the Web server 1F to the map DB server 2F. The map DB server 2F that has received the request for the discrimination information generates the discrimination information, and outputs the discrimination information to the Web server 1F. The Web server 1F that has received the discrimination information outputs the discrimination information to the PC 10. Here, the information about a display page like the display page shown in FIG. 2D (or a display page that can display the discrimination information) may be output at the same time, if necessary. The PC 10 that has received the discrimination information then outputs the terminal check map of the terminal size through the Web browser. When a user next performs a predetermined operation to input a distribution request, the distribution request is output from the PC 10 to the Web server 1F. Here, the point information or the like may be output at the same time, if necessary.

In this embodiment, the Web server program of the Web server 1F is designed to generate the map information for distribution as a download file in a predetermined format. Accordingly, the Web server 1F that has received the distribution request generates the map information for distribution, and distributes the map information for distribution to the PC 10. Here, a request for the setting information about the setting list data and the color palette data may be output to the map DB server 2F, and those pieces of information may be obtained from the map DB server 2F, if necessary. In this manner, the PC 10 is caused to display the terminal check map before the map information for distribution is distributed, so that the user can check the map to be displayed by the selected car audio device in advance. Accordingly, the user can adjust the point designated as the center point of the map in advance. As a result, the possibility that a desired area in a map is not shown by the selected car audio device is eliminated. Thus, the usability of maps to be displayed on the car audio device can be increased.

FIG. 9B is a flowchart illustrating the method for customizing a map to be displayed by a car audio device in the distribution of map information. The flowchart shown in FIG. 93 may be incorporated into the flowchart shown in FIG. 9A. In doing so, it is preferable that the flowchart shown in FIG. 9B is incorporated into the flowchart shown in FIG. 9A in such a manner that a user can customize the subject page before making a distribution request. When a user performs a predetermined operation to input a customization request, a request for a customizing display page is output from the PC 10 to the Web server 1F. The Web server 1F that has received this request outputs the information about a customizing display page like the display page shown in FIG. 2E or 2F (or a display page that can change the setting items or display colors) to the PC 10. As a result, the PC 10 displays the customizing display page by the Web browser.

When the user further performs a predetermined operation to change the settings, the information about the settings designated with respect to the setting items and display colors is output from the PC 10 to the Web server 1F. The PC 10 that has received the setting information outputs the setting information as a request for an update of the setting values to the map DB server 2F. Accordingly, the setting list data and the color palette data about the map information for distribution are changed by the map DB server 2F. In the flowchart shown in FIG. 9B, the map DB server 2F may further generate the discrimination information (the information for displaying the terminal size), and output the discrimination information to the PC 10 via the Web server 1F, if necessary. With this arrangement, the user can designate the contents and display colors of the information to be displayed by the selected car audio device, and check a customized map to be displayed by the car audio device in advance. Thus, the usability of maps to be displayed by the car audio device can be further increased.

In the map information distribution system 100F that has the Web server 1F to generate the map information for distribution in accordance with this embodiment, a request to check for user settings is output from the Web server 1F to the map DB server 2F when a user logs on, as shown in the flowchart of FIG. 9C. If there are user settings, the setting information about the setting list data and the color palette data should preferably be output as a response from the map DB server 2F to the Web server 1F. Accordingly, the user customizes the map information for distribution based on the setting information about the setting list data and the color palette data that has already been set. Thus, the usability of maps to be displayed by a selected car audio device can be increased. With the above described arrangement, this embodiment can provide a map information distribution method that can increase the usability of maps to be displayed by a car audio device that is different from the PC 10 that carries out searches.

Seventh Embodiment

Figure 10:
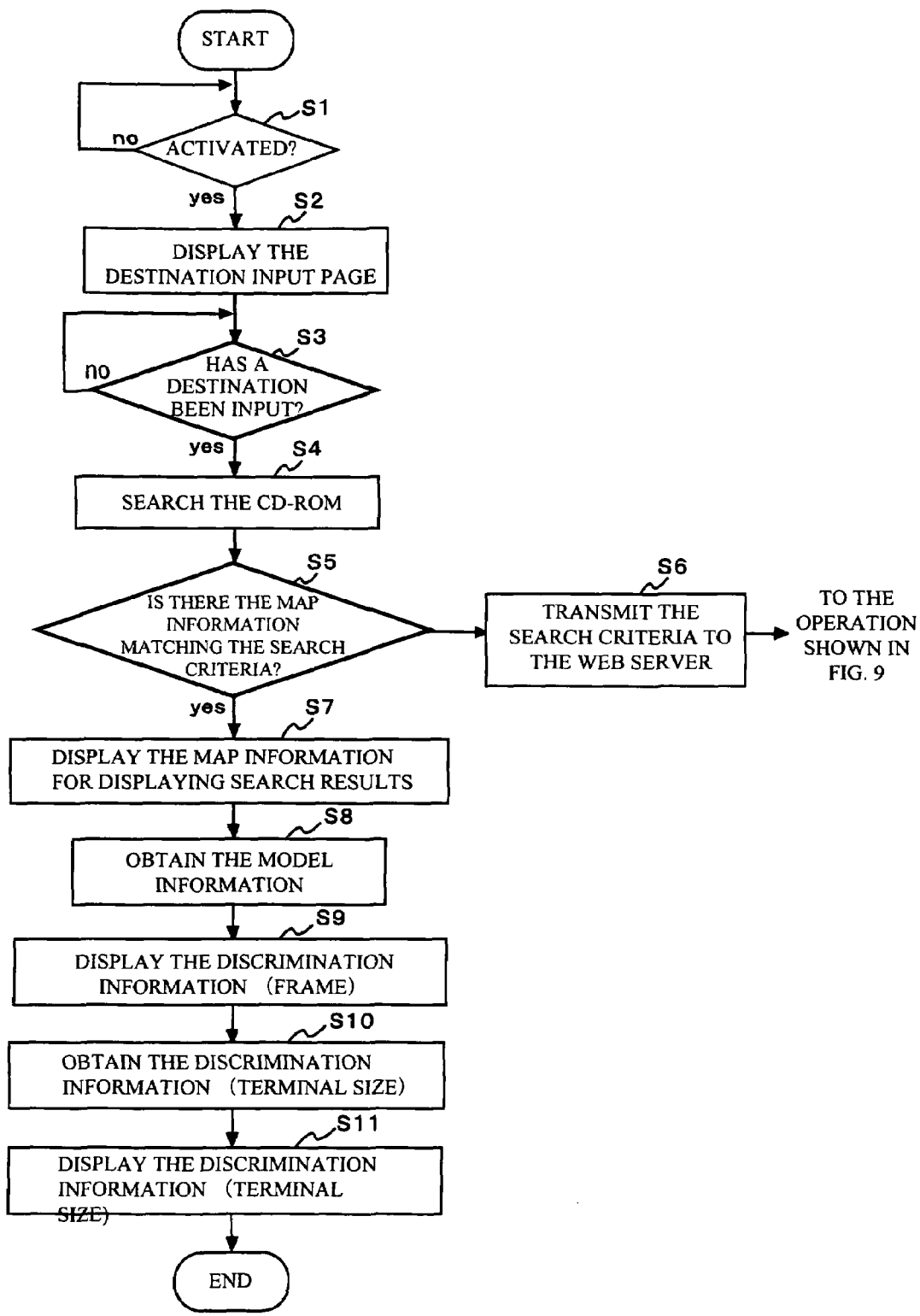
FIG. 10 is a flowchart showing procedures to be carried out by a personal computer that reads a program recorded on a recording medium in accordance with the present invention.

Referring now to the flowchart shown in FIG. 10, an embodiment of a computer-readable recording medium is described.

Figure 11:
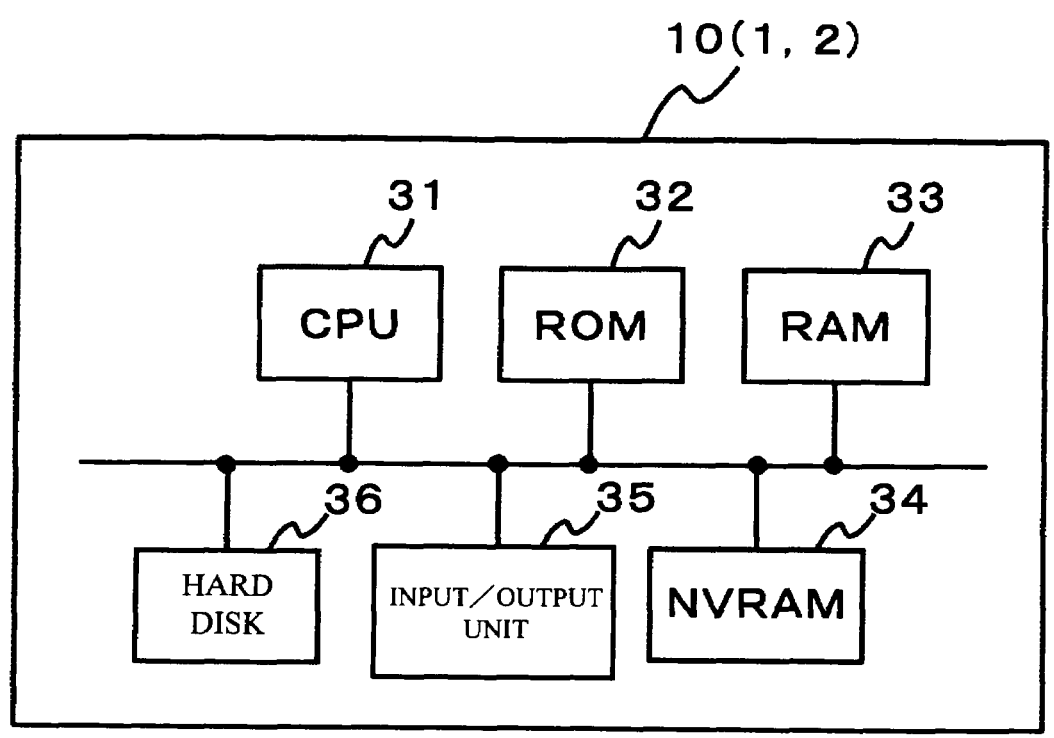
FIG. 11 shows the hardware structure of a personal computer, a Web server, and a map database server in accordance with the present invention.

In this embodiment, map information and a program for communication with the Web server 1F are recorded on a computer-readable recording medium such as a CD-ROM. When the program recorded on the recording medium is read by the PC 10 (although the PC 10 is taken as an example in this embodiment, it is possible to employ any other device that can read the program written on the recording medium and perform an operation in accordance with this program; the structure of such a device is shown in FIG. 11), this program is activated (step S1), and an operation in accordance with the flow shown in FIG. 10 is performed. In the following procedures are carried out by the CPU 31 (see FIG. 11) of the PC 10 that reads the program.

First, the CPU 31 causes the PC 10 to display the destination input page shown in FIG. 2A on the display of the PC 10 (step S2), and receives an input of a destination as the search criteria. When the user inputs the search criteria and clicks "SEARCH" ("YES" in step S3), the CPU 31 searches the map information stored in the data area of the CD-ROM, using the search criteria as the search key (step S4). If the map information matching the search criteria is not stored on the CD-ROM ("NO" in step S5), the CPU 31 connects the PC 10 to the Web server 1F. Connected to the Web server 1F, the CPU 31 transmits the search criteria input from the user to the Web server 1F (step S6), and performs the operation according to one of the flowcharts shown in FIGS. 9A, 9B, and 9C.

If the map information matching the search criteria is stored on the CD-ROM ("YES" in step S5), the CPU 31 reads the map information for displaying search results from the CD-ROM, and causes the PC 10 to display the map information for displaying search results (step S7). Here, the peripheral map display page shown in FIG. 2B may be output at the same time, if necessary.

When the user next performs a predetermined operation to input the model information, the CPU 31 obtains the model information (step S8), and generates the discrimination information (about the frame) (step S9). Here, the CPU 31 generates the discrimination information in accordance with the program read from the recording medium. Based on the discrimination information, a new map that has a frame indication included in the search result check map is generated. Here, the peripheral map display page shown in FIG. 2C may be output at the same time. On this peripheral map display page, a discrimination indication based on the discrimination information is superimposed on the search result check map.

Figure 5:
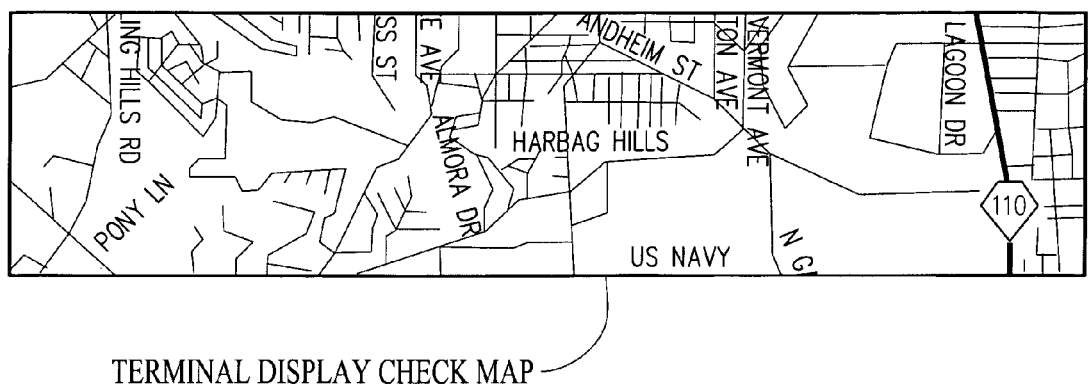
FIG. 5 schematically shows a terminal display check map in accordance with a third embodiment of the present invention.

When a request for the discrimination information (for displaying the terminal size) is input through a predetermined operation by the user (step S10), the CPU 31 generates and displays the discrimination information (step S11). Based on this discrimination information, the terminal size display page shown in FIG. 2D is displayed. On this terminal size display page, the terminal display check map shown in FIG. 5 is displayed, for example.

After checking on the terminal display check map, the user can use the terminal display check map as an image to be displayed by the car audio device.

As described above, in accordance with this embodiment, the PC 10 is caused to read a recording medium having a program recorded thereon, so as to obtain the map information according to search criteria from the server device, without a complicated procedure at the PC 10. Further, a discrimination indication can be superimposed on the search result check map or can be newly displayed, so that the user can recognize beforehand the area that can be displayed by the second terminal device.

Since map information is recorded beforehand on a recording medium such as a CD-ROM, there is no need to connect to the Web server 1 and download the map information, as long as the map information matching the search criteria is stored on the recording medium.

Although the recording medium is a CD-ROM in this embodiment, it is also possible to use a USB (Universal Serial Bus) memory or a flash memory such as a smart media card.

Referring now to FIG. 11, the hardware structure of each of the PC 10, the Web servers 1A through 1F, and the map DB servers 2A through 2F is described.

The hardware structure includes the CPU 31, a ROM 32, a RAM 33 a NVRAM (Non-Volatile RAM) 34, an input/output unit 35, and a hard disk 36. The CPU 31 reads a program stored on the ROM 32, and performs an operation in accordance with this program. The CPU 31 of the PC 10 reads a program recorded on a CD-ROM, and performs an operation in accordance with the flowchart shown in FIG. 10. The data about operation results is written on the RAM 33, and data that is written on the RAM data and needs to be saved when the power is switched off is written on the NVRAM 34.

The hard disk 36 is designed to have data recorded thereon. For example, the display scale information, the display area information, and the likes are stored on the hard disk 36 of each of the Web servers 1A through 1F. A hard disk device 37 in which the distribution area information, the map data, the display list data, the color palette data, and the likes are stored is provided for the hard disk 36 of each of the map DB servers 2A through 2F.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, a distribution request may be made not only from the first terminal device that carries out searches, but also from a mobile communication terminal such as a portable telephone device that has an information communicating function and can exchange information with the second terminal device through wire or wireless communications, or some other terminal device that has an information communicating function and can exchange information with the second terminal device through wire or wireless communications. With this arrangement, the trouble of storing the map information for distribution on a recording medium in advance can be eliminated when the map information for distribution is used at the second terminal device. Thus, higher usability can be achieved.

Although the map DB server carries out searches for maps and the likes in each of the above described embodiments, the map data may be stored in the map DB server, so that the Web server can access the map DB server and read necessary data from the map DB server. In other words, the map DB server may be merely a data bank, and all searches and the likes may be carried out by the Web server. In such a case, the DB server program is installed in the Web server. Also, the user setting information (such as the setting list data and the color palette data) may not be stored in the map DB server, but may be stored in some other database server.

The present invention is based on Japanese Patent Application No. 2006-347231 filed on Dec. 25, 2006 and Japanese Patent Application No. 2007-304194 filed on Nov. 26, 2007, the entire disclosure of which is hereby incorporated by reference.

What is claimed is:

1. A map information distribution system that carries out a search based on search criteria that is input from a first terminal device, outputs predetermined map information for displaying search results to the first terminal device, causes the first terminal device to display a map based on the map information for displaying search results, and distributes predetermined map information for distribution in response to a distribution request, the map information distribution system comprising:
a discrimination information outputting unit that receives model information of a second terminal device sent from the first terminal device, the map information being distributed to the second terminal device, that generates discrimination information based on the model information, the discrimination information being designed to distinguish an area displayed by the second terminal device that uses the map information for distribution, from other portions in the map displayed by the first terminal device based on the map information for displaying search results, and that outputs the discrimination information to the first terminal device, and causes the first terminal device to display the discrimination indication based on the discrimination information before the map information for distribution is distributed.

2. The map information distribution system as claimed in claim 1, wherein the discrimination information is indication information about a frame that surrounds the area that can be displayed by the second terminal device.

3. The map information distribution system as claimed in claim 1, wherein the discrimination information is indication information for blurring portions outside the area that can be displayed by the second terminal device.

4. The map information distribution system as claimed in claim 1, wherein the discrimination information is indication information for displaying only the area that can be displayed by the second terminal device.

5. The map information distribution system as claimed in claim 1, wherein the discrimination information is indication information for displaying only the area that can be displayed by the second terminal device in the same display format as the map to be displayed by the second terminal device.

6. The map information distribution system as claimed in claim 1, wherein the first terminal device can designate the contents of information to be included in the map information for distribution.

7. The map information distribution system as claimed in claim 1, wherein the first terminal device can designate display colors of information to be included in the map information for distribution.

8. A method for distributing map information by which a search is carried out based on search criteria that is input from a first terminal device, predetermined map information for displaying search results is output to the first terminal device, the first terminal device is caused to display a map based on the map information for displaying search results, and predetermined map information for distribution is distributed in response to a distribution request, the method comprising the steps of:
receiving model information of a second terminal device sent from the first terminal device, the map information being distributed to the second terminal device;
generating discrimination information based on the model information, the discrimination information being designed to distinguish an area displayed by the second terminal device that uses the map information for distribution, from other portions in the map displayed by the first terminal device based on the map information for displaying search results; and
outputting the discrimination information to the first terminal device, and causing the first terminal to display the discrimination indication based on the discrimination information before the map information for distribution is distributed.

9. A non-transitory computer-readable recording medium storing a computer readable program for causing a computer mounted on a server device to:
receive model information of a terminal device and a search criteria for searching for map information that is recorded in a storing portion sent from a different terminal device, the map information being distributed to the terminal device;
obtain the map information for displaying search results in accordance with the search criteria from the storing portion;
generate discrimination information based on the model information, the discrimination information being designed to distinguish an area displayed by the terminal device, from other portions in the map displayed by the different terminal device based on the map information for displaying search results; and output the discrimination information to the different terminal device, and cause the different terminal device to display the discrimination indication based on the discrimination information before the map information for distribution is distributed.

\* \* \* \* \*